(12) United States Patent
Johnson et al.

(10) Patent No.: US 6,819,054 B2
(45) Date of Patent: Nov. 16, 2004

(54) CHARGE BALLAST ELECTRONIC CIRCUIT FOR CHARGE EMISSION DEVICE OPERATION

(75) Inventors: Scott V. Johnson, Scottsdale, AZ (US); Bernard F. Coll, Fountain Hills, AZ (US); Kevin O'Connor, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/280,520

(22) Filed: Oct. 25, 2002

(65) Prior Publication Data

US 2004/0080278 A1 Apr. 29, 2004

(51) Int. Cl.$^7$ .......................... H05B 37/00; G09G 3/22
(52) U.S. Cl. ...................... 315/167; 345/75.2
(58) Field of Search .................. 315/169.1, 169.3, 315/167; 345/74.1, 75.2, 76–77; 313/309–310

(56) References Cited

U.S. PATENT DOCUMENTS

| | | | | |
|---|---|---|---|---|
| 4,884,010 A | * | 11/1989 | Biberian | 315/366 |
| 5,742,267 A | * | 4/1998 | Wilkinson | 345/77 |
| 5,757,340 A | * | 5/1998 | Okamoto et al. | 345/22 |
| 5,856,812 A | * | 1/1999 | Hush et al. | 345/74.1 |
| 5,909,200 A | * | 6/1999 | Hush | 345/74.1 |
| 6,028,576 A | * | 2/2000 | Hush | 345/75.1 |
| 6,031,336 A | * | 2/2000 | Rumbaugh et al. | 315/169.3 |
| 6,069,451 A | * | 5/2000 | Hush et al. | 315/169.1 |
| 6,204,608 B1 | * | 3/2001 | Song et al. | 315/169.3 |
| 6,380,913 B1 | * | 4/2002 | Hush et al. | 345/75.2 |
| 6,492,777 B1 | * | 12/2002 | Hush | 315/169.3 |

OTHER PUBLICATIONS

"Fundamentals of Network Analysis", Gene H. Hostetter, Harper & Row, Publishers, New York, 1980, p. 210.*

* cited by examiner

Primary Examiner—Thuy Vinh Tran
(74) Attorney, Agent, or Firm—William E. Koch

(57) ABSTRACT

An electronic circuit apparatus (5) for a field emission device (14) comprises a charge emission device electrically connected to a charge ballast electronic circuit (13,15). The charge ballast electronic circuit includes a capacitance device (25,26) electrically connected in series with a transistor (10,12) and electrically connected in parallel with a resistor (28,23) where the capacitance is chosen to adjust a charge emitted by the field emission device.

19 Claims, 1 Drawing Sheet

CHARGE BALLAST ELECTRONIC CIRCUIT FOR CHARGE EMISSION DEVICE OPERATION

FIELD OF THE INVENTION

The present invention relates to charge emitters, and more particularly, to a novel field emitter with a substantially constant field emission current.

BACKGROUND OF THE INVENTION

Field emission devices (hereinafter referred to as "FED's") are well known in the art and are commonly employed for a broad range of applications including image display devices. An example of a FED is described in U.S. Pat. No. 5,142,184 issued on Aug. 25, 1992. Prior FED's typically have a cathode or emitter that is utilized to emit charges that are attracted to a distally disposed anode. A voltage differential is created between the emitter and an extraction grid or gate in order to facilitate charge emission from the emitter. Often, arcing or breakdown occurs between the emitter and the gate causing large current flow through the emitter. The breakdown can result from, among other things, an inefficient vacuum or from insufficient distance between the emitter and the gate. The breakdown generally damages or destroys the emitter.

Further, charge emission from a FED is generally a function of time. An example is the use of an FED to generate a grey scale wherein the gate of the FED is pulse width modulated. However, FED's used in these applications have traditionally been plagued by current runaway and unwanted discharges from the cathode to the anode that cause catastrophic damage to the device, especially in display applications. The common solution to this problem is to use a resistive ballast (in series with the cathode or emitter) to control the gate voltage. This solution, however, is only partially effective and negatively impacts FED efficiency and cost.

Accordingly, it is desirable to have a field emission device that prevents damaging the emitter during breakdown between the emitter and gate, and that substantially prevents breakdown between the emitter and gate.

SUMMARY OF THE INVENTION

To achieve the objects and advantages specified above and others, an electronic circuit apparatus for a charge emission device is disclosed. In the preferred embodiment, the apparatus includes a field emission device electrically connected to a charge ballast electronic circuit, wherein the charge ballast electronic circuit includes a capacitance device electrically connected in parallel with a resistor. Further, an electronic switch is electrically connected in series with the capacitance device. The electronic switch allows the field emission device to emit electrons while the capacitance device charges to a voltage. As the capacitance device charges, the charge emission decreases.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the following drawings.

DETAILED DESCRIPTION OF THE PREFERRED EMBODIMENT

Figure 1:
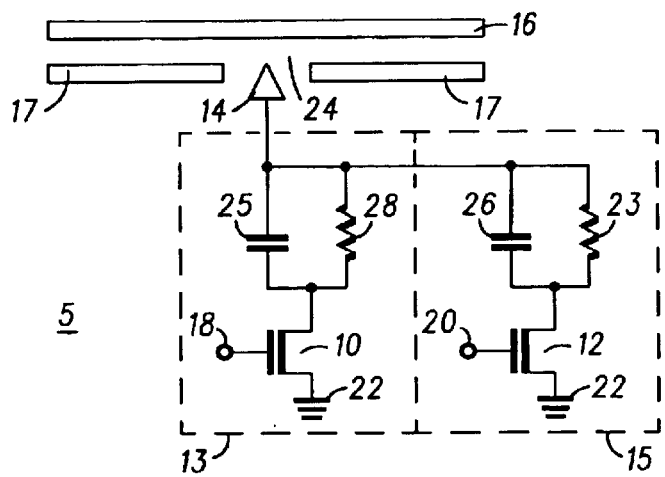
FIG. 1 is a circuit schematic illustrating an electronic circuit apparatus for a charge emission device in accordance with the present invention.

Referring to FIG. 1 which is a simplified schematic that illustrates an electronic circuit apparatus 5 for a field emission device 14, wherein in a preferred embodiment, apparatus 5 includes a charge ballast electronic circuit 13 and a charge ballast electronic circuit 15. It will be understood that while apparatus 5 includes two charge ballast electronic circuits 13 and 15, it is anticipated that apparatus 5 can include one or more charge ballast electronic circuits and the use of two charge ballast electronic circuits in this embodiment is for illustrative purposes only. Further, electronic circuits 13 and 15 are illustrated as being electrically connected in parallel, but it is anticipated that other circuit configurations are possible. It will also be understood that portions of apparatus 5 can be fabricated as an integrated circuit or can include discrete electronic components, or combinations thereof.

Electronic circuit 13 includes a capacitance device 25 electrically connected to field emission device 14 and a transistor 10 with an electrical input 18. In the preferred embodiment, capacitance device 25 includes a capacitor, but it will be understood that capacitance device 25 can include, for example, a discrete capacitor, an integrated capacitor, a transistor, an emitter line, or another suitable charge storage device. Field emission device 14 can be, for example, a carbon nanotube, a spindt tip, or another suitable charge emission device. In the preferred embodiment, field emission device 14 emits electrons that are attracted to an anode 16 that is distally disposed from field emission device 14. The space between device 14 and anode 16 is generally evacuated to form a vacuum. Gate 17 typically is a conductive material having an emission opening 24 that is substantially centered to device 14 so that charges may pass therethrough gate 17. Typically, electron emission from device 14 is stimulated by creating a voltage differential between device 14 and gate 17. A voltage differential of approximately ten volts to one hundred volts generally is utilized to stimulate the electron emission.

In the preferred embodiment, transistor 10 includes a MOSFET, but it will be understood that transistor 10 can include other electronic switches or transistor devices such as a BJT, JFET, or the like. The use and behavior of these devices is well known to those skilled in the art. Transistor 10 is electrically connected to a current return 22. Further, in the preferred embodiment, a resistor 28 is electrically connected in parallel with capacitance device 25.

Electronic circuit 15 includes a capacitance device 23 electrically connected to field emission device 14 and a transistor 12 with an electrical input 20. In the preferred embodiment, transistor 12 includes a MOSFET, but it will be understood that transistor 12 can include other electronic switches or transistor devices such as a BJT, JFET, or the like. The use and behavior of these devices is well known to those skilled in the art. Transistor 12 is electrically connected to a current return 22. Further, in the preferred embodiment, a resistor 26 is electrically connected in parallel with capacitance device 23. In the preferred embodiment, capacitance device 25 has a capacitance value different from that of the capacitance value of capacitance device 23, as will be discussed presently.

Circuit 13 (and, similarly, charge ballast electronic circuit 15) operates to allow a substantially constant charge to be stored by capacitance device 25 and emitted by field emission device 14 when transistor 10 is turned on by applying a voltage to electrical input 18. Resistor 28 is a ballast resistor that allows capacitance device 25 to be discharged.

Figure 2:
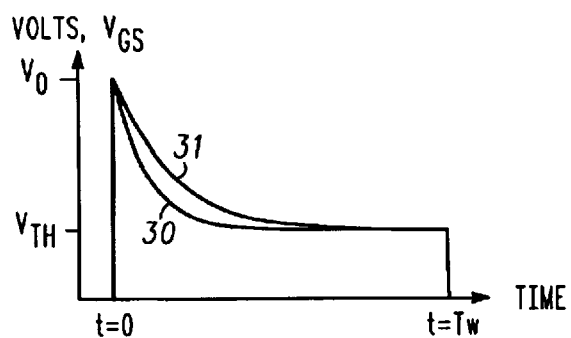
FIG. 2 is a plot illustrating the gate-cathode voltage versus time for the electronic circuit apparatus in accordance with the present invention.

Referring to FIG. 2, a plot illustrating a voltage $V_{GS}$ (volts) vs. time (seconds) is shown for a pixel 30 and a pixel 31, wherein $V_{GS}$ is the voltage potential difference between gate 17 and field emission device 14. In this example, pixel 30 is for a field emission device 14 which operates at a current $I_{30}$, and pixel 31 is for a field emission device which operates at a current $I_{31}$ smaller than pixel A($I_{30}>I_{31}$). In this example, a voltage pulse of amplitude $V_0$ and pulse width $T_w$ can be applied to electrical input 18 of transistor 10. Thus, at $T_w=0$ seconds, $V_{GS}$ is equal to $V_0$.

As electrons are emitted from device 14, a charge begins to build up on capacitance device 25. As a voltage across capacitance device 25, $V_C$, increases, $V_{GS}$ decreases by the same amount, as will be discussed presently. However, $V_{GS}$ for pixel 30 will decrease at a faster rate than $V_{GS}$ for pixel 31 because pixel 30 is emitting electrons at a faster rate than pixel 31. Once enough electrons have been emitted from device 14, $V_{GS}$ will decrease to a threshold voltage, $V_{TH}$, until very little electron emission is occurring.

Figure 3:
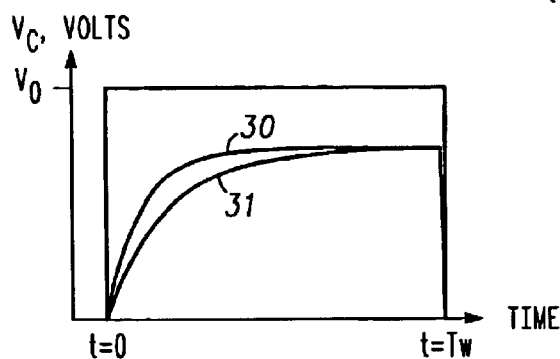
FIG. 3 is a plot illustrating the capacitance device voltage versus time for the electronic circuit apparatus in accordance with the present invention.

Referring now to FIG. 3, a plot illustrating capacitance device voltage $V_c$ (volts) vs. time (seconds) is shown for pixel 30 and pixel 31. As discussed previously, $V_{GS}$ for pixel 30 decreases at a faster rate than $V_{GS}$ for pixel 31. As a result, $V_c$ for pixel 30 increases at a faster rate than pixel 31, as illustrated. Further, if $V_0$ is large compared to an amount of variation in $V_{TH}$ from pixel to pixel, the total number of electrons emitted by each pixel will be approximately equal. As a result, a human observer will tend to integrate a flash of light from a phosphor at anode 16 and tend to not notice the difference between a shorter but brighter flash of light when compared to a longer but dimmer flash of light.

Figure 4:
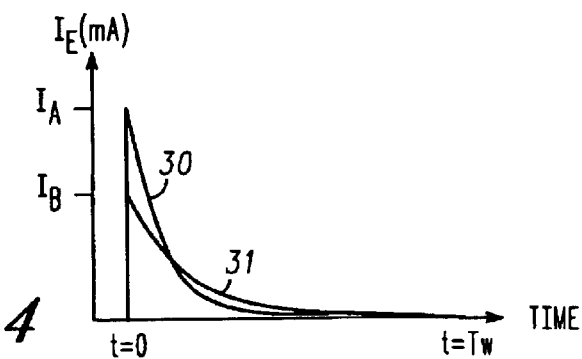
FIG. 4 is a plot illustrating the charge emission current versus time for the electronic circuit apparatus in accordance with the present invention.

Referring to FIG. 4, a plot illustrating a current $I_E$ (milliamps) vs. time (seconds) curve is shown for pixel 30 and pixel 31. The current $I_E$ is the field emission current of device 14 as indicated in FIG. 1. As shown, pixel 30 emits more current at time T=0 seconds, but capacitance device 25 discharges quicker to time $T=T_W$. Pixel 31 emits less current at a time T equal to zero seconds, but its capacitance device discharges slower to time $T=T_W$. However, the area under the $I_E$ vs time curve is approximately equal for pixel 30 and pixel 31 indicating that the total charge emitted is approximately equal.

As discussed previously and illustrated in FIG. 1, apparatus 5 includes charge ballast electronic circuit 13 electrically connected in parallel with charge ballast electronic circuit 15 wherein, in the preferred embodiment, capacitance device 25 has a different capacitance value than capacitance device 23. This configuration allows the generation of a grey scale, as will be discussed presently. In the preferred embodiment, apparatus 5 has a four level grey scale. In particular, when transistor 10 is turned on and transistor 12 is turned off, a charge $Q_{30}$ is stored on capacitance device 25 and discharged through field emission device 14 giving one level of the grey scale. Further, when transistor 12 is turned on and transistor 10 is turned off, a charge $Q_{31}$ is stored on capacitance device 23 and discharged through field emission device 14 giving a second level of the grey scale. When transistors 10 and 12 are both turned on, $Q_{30}$ is stored on capacitance device 25 and $Q_{31}$ is stored on capacitance device 23, wherein a total charge of $Q_{30}$ plus $Q_{31}$ is discharged through field emission device 14 giving a third level of the grey scale. The fourth level of the grey scale is obtained when both transistors 10 and 12 are turned off so that a charge is not emitted through field emission device 14.

Thus, electronic circuit apparatus 5 allows a specific amount of charge to be emitted through a field emission device and, thereby, reduce arcing. Apparatus 5 also improves uniformity and lifetime, while decreasing granularity. Further, the use of multiple charge ballast electronic circuits allows apparatus 5 to have a multiple grey scale which has superior properties to a grey scale generated with pulse width modulation. Potential applications for apparatus 5 include atomic resolution storage, FED displays, direct e-beam lithography devices, velocity modulated radio frequency or microwave sources.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An electronic circuit apparatus for a field emission device, the apparatus comprising:
    a plurality of charge ballast electronic circuits connected in parallel, each of the charge ballast electronic circuits comprising at least one capacitance device connected in parallel to a resistor and an electronic switch coupled in series thereto; and
    a charge emission device electrically connected to the charge ballast electronic circuits.

2. An apparatus as claimed in claim 1 wherein at least one resistor is electrically connected in parallel with the at least one capacitance device.

3. An apparatus as claimed in claim 1 wherein the electronic switch includes a semiconductor transistor wherein the semiconductor transistor includes an electrical input, a first electrical connection, and a second electrical connection.

4. An apparatus as claimed in claim 3 wherein the second electrical connection of the semiconductor transistor is electrically connected to a current return and the first electrical connection of the semiconductor transistor is electrically connected to the at least one capacitance device.

5. An electronic circuit apparatus for a field emission device, the apparatus comprising:
    a plurality of charge ballast electronic circuits connected in parallel, each of the charge ballast electronic circuits comprising at least one capacitance device connected in parallel to a resistor; and
    a charge emission device, electrically connected to the plurality of charge ballistic electronic circuits;
    wherein the at least one capacitance device includes a plurality of capacitance devices connected in series, each of the plurality of one capacitance devices has a value different from the at least one capacitance device in each adjacent charge ballast electronic circuit.

6. An apparatus as claimed in claim 1 wherein at least one of the capacitance device includes a transistor electronic device and a capacitor connected in series thereto.

7. An electronic circuit apparatus for a field emission device, the apparatus comprising:
- a first electronic switch electrically connected to a current return and a first electrical connection of a first capacitance device;
- a second electronic switch electrically connected to the current return and a first electrical connection of a second capacitance device;
- wherein a second electrical connection of the first capacitance device is electrically connected to a second electrical connection of the second capacitance device; and
- wherein a charge emission device is electrically connected to the second electrical connection of the first capacitance device.

8. An apparatus as claimed in claim 7 wherein at least one resistor is electrically connected in parallel with at least one of the first capacitance device and the second capacitance device.

9. An apparatus as claimed in claim 7 wherein at least one of the first and the second electronic switches includes a semiconductor transistor wherein the semiconductor transistor includes an electrical input, a first electrical connection, and a second electrical connection.

10. An apparatus as claimed in claim 9 wherein the second electrical connection of the semiconductor transistor is electrically connected to a current return and the first electrical connection of the semiconductor transistor is electrically connected to at least one of the first electrical connection of at least one of the first capacitance device and the second capacitance device.

11. An apparatus as claimed in claim 7 wherein the first capacitance device has a capacitance different from a capacitance of the second capacitance device.

12. An apparatus as claimed in claim 7 wherein at least one of the first and the second capacitance devices includes one of a capacitor, a transistor, and another suitable electronic device which has a capacitance.

13. A method of controlling a charge emitted from a field emission device, the method comprising the steps of:
- providing a charge emission device; and
- providing a plurality of charge ballast electronic circuit connected in parallel, each electronic connected to the charge emission device wherein each of the charge ballast electronic circuits includes at least one capacitance device connected in parallel to a resistor and an electronic switch coupled in series thereto.

14. A method as claimed in claim 13 wherein each of the charge ballast electronic circuits further includes at least one resistor which is electrically connected in parallel with the at least one capacitance device.

15. A method as claimed in claim 13 wherein the electronic switch includes a semiconductor transistor wherein the semiconductor transistor includes an electrical input, a first electrical connection, and a second electrical connection.

16. A method as claimed in claim 15 wherein the second electrical connection of the semiconductor transistor is electrically connected to a current return and the first electrical connection of the semiconductor transistor is electrically connected to the at least one capacitance device.

17. A method as claimed in claim 13 wherein the at least one capacitance device includes a plurality of capacitance devices connected in series, each of the plurality of one capacitance devices has a value different from the at least one capacitance device in each adjacent charge ballast electronic circuit.

18. A method as claimed in claim 17 wherein the capacitance of the at least one capacitance device is chosen to adjust a charge emitted by the field emission device.

19. A method as claimed in claim 13 wherein at least one capacitance device includes a transistor and a capacitor connected in series.

* * * * *

UNITED STATES PATENT AND TRADEMARK OFFICE
CERTIFICATE OF CORRECTION

PATENT NO. : 6,819,054 B2
DATED : November 16, 2004
INVENTOR(S) : Scott V. Johnson et al.

It is certified that error appears in the above-identified patent and that said Letters Patent is hereby corrected as shown below:

Column 4,
Line 65, insert -- the -- after "wherein".
Line 66, delete "of the" and "electronic".
Line 67, delete "device".

Column 6,
Line 6, change "electronic" to -- electrically --.

Signed and Sealed this

Tenth Day of January, 2006

JON W. DUDAS
*Director of the United States Patent and Trademark Office*